(12) United States Patent
Gentry

(10) Patent No.: US 9,776,654 B2
(45) Date of Patent: Oct. 3, 2017

(54) ACCESSORY MOUNT FOR FRONT FORK

(71) Applicant: Mototrax, LLC, Moscow, ID (US)

(72) Inventor: Randy Gentry, Moscow, ID (US)

(73) Assignee: Mototrax, LLC, Moscow, ID (US)

(*) Notice: Subject to any disclaimer, the term of this patent is extended or adjusted under 35 U.S.C. 154(b) by 0 days.

(21) Appl. No.: 15/056,048

(22) Filed: Feb. 29, 2016

(65) Prior Publication Data

US 2017/0247045 A1  Aug. 31, 2017

(51) Int. Cl.
| | |
|---|---|
| *B62B 19/00* | (2006.01) |
| *B62B 19/04* | (2006.01) |
| *B62D 65/02* | (2006.01) |
| *B62K 13/00* | (2006.01) |

(52) U.S. Cl.
CPC .............. *B62B 19/04* (2013.01); *B62D 65/02* (2013.01); *B62K 13/00* (2013.01)

(58) Field of Classification Search
CPC .......... B62B 19/04; B62D 65/02; B62K 13/00
See application file for complete search history.

(56) References Cited

U.S. PATENT DOCUMENTS

| | | | | |
|---|---|---|---|---|
| 3,783,959 A * | 1/1974 | Krume | .................... | B62B 13/18 |
| | | | | 180/183 |
| 4,613,006 A * | 9/1986 | Moss | ..................... | B62K 13/00 |
| | | | | 180/184 |
| 5,203,424 A * | 4/1993 | Gogo | ..................... | B62K 13/00 |
| | | | | 180/190 |
| 5,474,146 A * | 12/1995 | Yoshioka | ............... | B62K 13/00 |
| | | | | 180/184 |
| 5,853,061 A * | 12/1998 | Yamamoto | ............. | B62M 27/02 |
| | | | | 180/190 |
| 6,095,275 A * | 8/2000 | Shaw | ..................... | B62K 13/00 |
| | | | | 180/185 |
| 6,298,962 B1 * | 10/2001 | Kato | ...................... | B60G 7/001 |
| | | | | 188/321.11 |
| 6,470,987 B1 * | 10/2002 | Friend | .................... | B62K 13/00 |
| | | | | 180/182 |
| 6,783,133 B1 * | 8/2004 | Araujo | ................... | B62B 19/04 |
| | | | | 280/7.14 |

(Continued)

OTHER PUBLICATIONS

"The Timbersled Mountain Horse," available as early as Dec. 24, 2014, retrieved on Dec. 6, 2016, at <<http://timbersled.com>>, Timbersled Products, Inc.

(Continued)

*Primary Examiner* — Kevin Hurley
*Assistant Examiner* — Marlon A Arce
(74) *Attorney, Agent, or Firm* — Lee & Hayes, PLLC

(57) ABSTRACT

A system and method for mounting one or more accessories to a vehicle with forks is disclosed. The system can include a frame comprising mounting plates, the mounting plates including at least an axle hole and a fork stop hole. The frame can also include frame rails to connect the mounting plate to an accessory mount. The system can be mounted to the forks of the vehicle using the axle hole and an axle. A fork stop can be placed in the fork stop hole and can include one or more interface points to fit the bottom of the forks. The fork stop can transmit forces from the accessory to the forks in a linear manner and to a location where the forks have additional strength. The fork stop can be designed such that it bends in response to an impact rather than breaking the forks.

12 Claims, 7 Drawing Sheets

(56) References Cited

U.S. PATENT DOCUMENTS 7,896,362 B1 * 3/2011 Scatchard .............. B62K 13/00
                                                                                 280/7.1

OTHER PUBLICATIONS

"Yeti SMX," available as early as Sep. 30, 2015, retrieved on Dec. 6, 2016, at <<http://yetisnowmx.ca/#products.com, Yeti Snow MX.

* cited by examiner

ACCESSORY MOUNT FOR FRONT FORK

BACKGROUND

Snow machining is a popular winter sport. Snow machines have evolved from basic winter transportation used in remote areas to a fully developed motorsport. Long travel suspensions and powerful engines have enabled snow machines to compete in arenas formerly occupied only by motorcycles and bicycles. Events involving snow machines include snow machine motocross, free-style jumping, and cross country racing, among other things.

Despite many advances, however, snow machines are still large, heavy machines. As a result, they may not be suitable for certain conditions. Snow machines may be unable to navigate heavily wooded areas, for example, because they cannot easily steer between closely spaced trees. This may be because they are too wide, too long, or have a large turning radius, among other things. Snow machines may also have difficulty navigating deep powder, for example, because their weight causes them to sink into the snow. In addition, despite advances in suspension technology, snow machines are limited as to the height and types of jumps they can sustain.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As mentioned above, there are a number of conditions that may preclude the use of a full-sized snow machine. A snow machine may be unable to fit or maneuver through dense woods, for example, because the machine is physically too large or cannot turn quickly enough to avoid trees and other obstacles. Similarly, heavy snow machines tend to sink in deep, fresh powder, making them ponderous in these conditions.

These situations may be better suited to lightweight and powerful off road motorcycles, such as motocross bikes. Motocross bikes, like most motorcycles, however, are difficult to drive in the snow. The relatively narrow tires tend to sink in the snow and, while knobby tires can be quite aggressive, off road tires tend to simply spin in snow or on ice. The lack of traction makes simply staying upright in the snow on a motorcycle difficult.

To this end, systems exist that try to meld the advantageous features of a snow machine with those of a motocross bike. The inventors have invented a system to attach a ski to the forks of a motorcycle and to replace the rear wheel and swingarm of the motorcycle with a track and swingarm system similar to those found on snow machines. See, e.g., http://www.moto-trax.com/. The system enables a motorcycle to be converted to a hybrid motorcycle/snow machine. The resulting combination provides better traction and stability in snow and ice than a convention motorcycle configuration. The combination also provides a lighter more nimble vehicle with improved suspension and jumping capabilities than a conventional snow machine.

Figure 1:
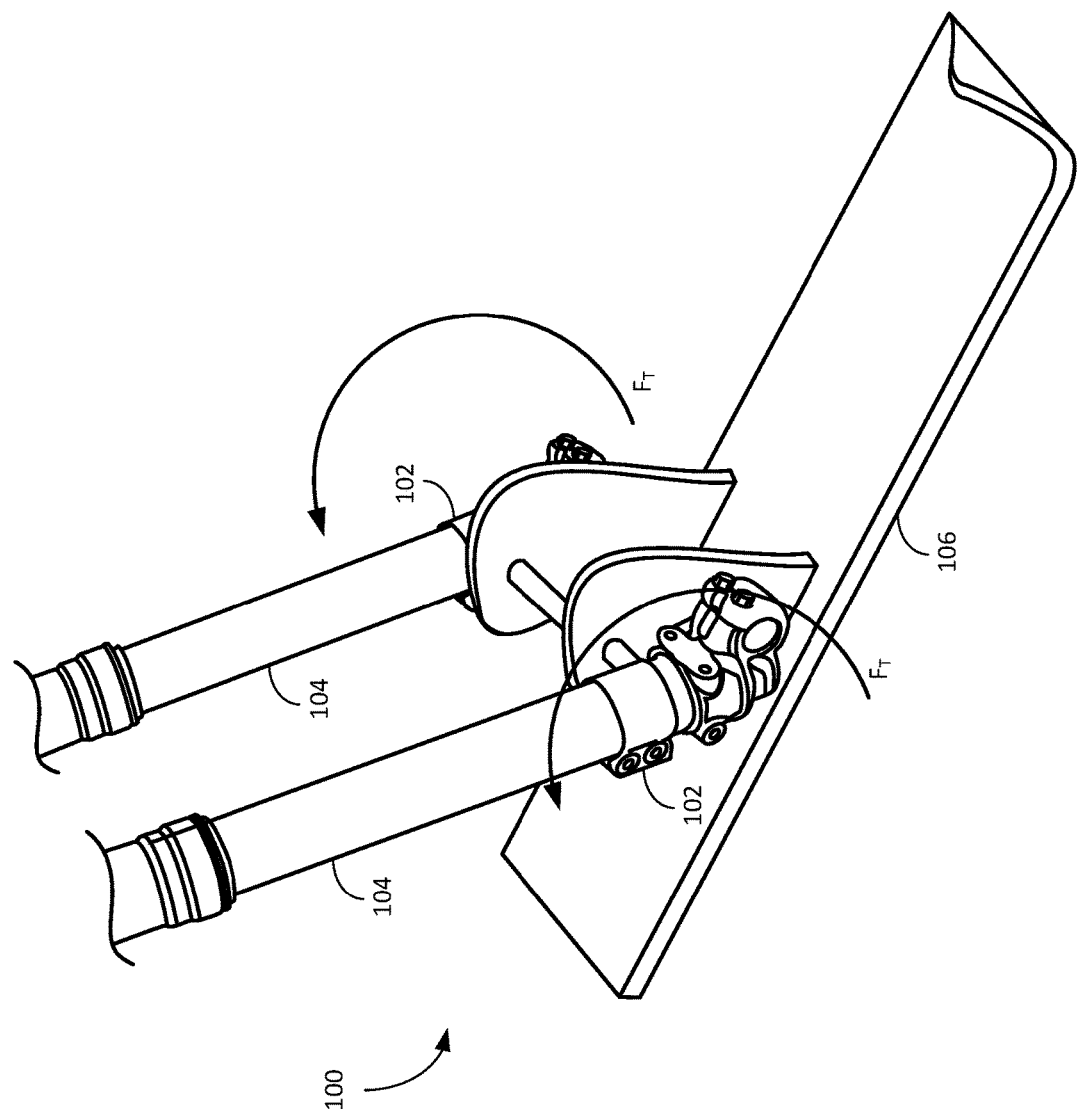
FIG. 1 depicts a right, front, perspective view of a conventional ski mount for motorcycles that clamps onto the forks of the motorcycle.

As shown in FIG. 1, conventionally, the ski mount 100 for the forks of the motorcycle has included clamps 102 that clamp around the bottom of the fork legs 104. This configuration presents several problems however. For one, the clamp 102 may be placed on a portion of the fork leg 104 does not have sufficient strength. In other words, without disassembling the fork or having engineering drawings, it is difficult, or impossible, for the user to locate a sufficiently strong mounting location on the fork leg 104 (if one exists). In addition, because many fork legs 104 have substantially constant cross-sections along their length, the mounting position for the clamps 102 can vary widely from user to user. In other words, the user can place the clamps 102 anywhere along the fork tube 104, introducing variability. As a result, a strong or awkward impact to the ski 106 can cause a bending or twisting force, $F_T$, on the fork legs 104.

This twisting force can cause the fork legs 104 to crack or break. This poses an obvious safety issue as the user may lose control of the vehicle due to the broken fork leg 104. In addition, a broken fork leg 104 poses a possible environmental concern if fork oil leaks onto the ground. In addition, fork legs 104 for a modern motocross bike can cost $2500 or more to replace. This represents a significant portion of the cost of the motorcycle.

Because most impacts on the ski 106 are not aligned with the fork leg 104, and due to the geometry of the clamps 102, an impact to the ski 106 generates this bending force, $F_T$, about the clamp 102 on the fork leg 104. In other words, the impact is not channeled directly up the forks—as it would if a wheel were mounted—but instead has several components. At least one of these components is the bending force, $F_T$, about the clamp 102. This exerts a twisting force on the fork leg 104 that it was not intended to absorb, which can also cause breakage. At the very least, $F_T$ can cause misalignment of the bushings and seals in the fork causing stiction, which diminishes fork travel, fork smoothness, and causes abnormal wear on the seals and bushings, among other things.

Figure 2:
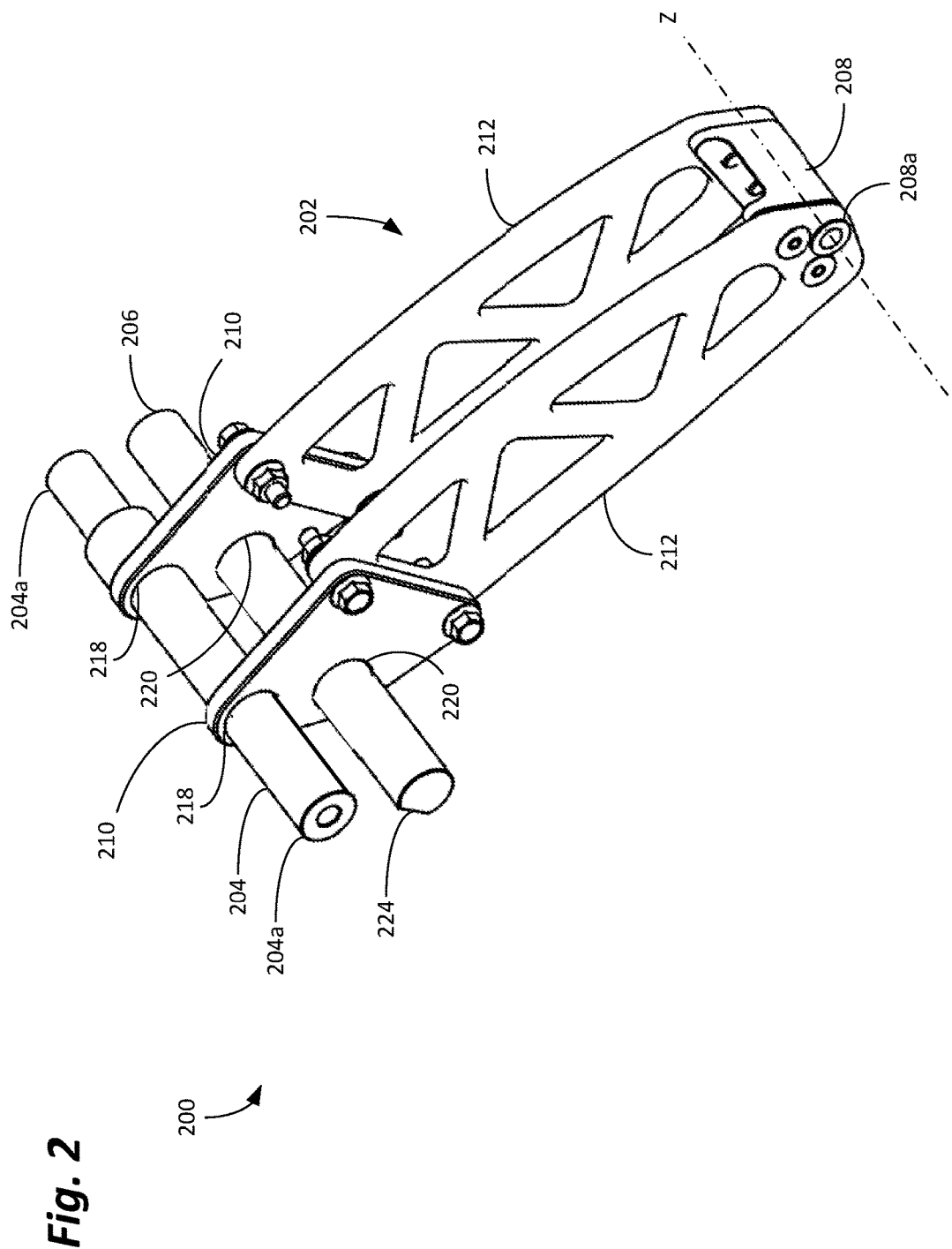
FIG. 2 depicts a right, front, perspective view of the accessory mount for forked vehicles, in accordance with some examples of the present disclosure.
Figure 3:
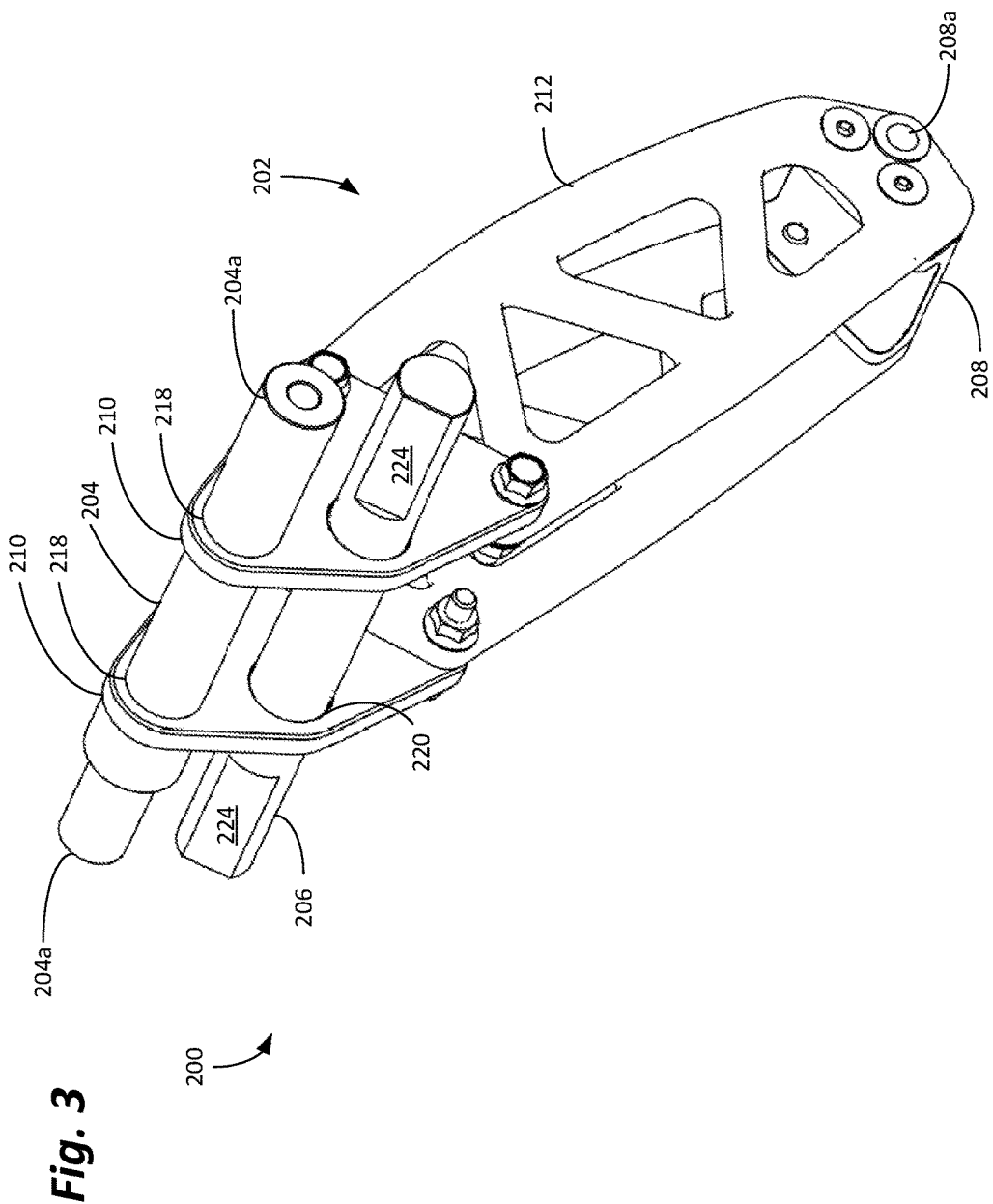
FIG. 3 depicts a right, rear perspective view of the accessory mount for forked vehicles, in accordance with some examples of the present disclosure.

To this end, as shown in FIGS. 2 and 3, examples of the present disclosure can comprise a system 200 for mounting one or more accessories to a forked vehicle. The forked vehicle is described herein as an off road motorcycle, such as a motocross or enduro bike. Of course, other forked vehicles could be included, such as street bikes, bicycles, and other types of cycles, among other things. The one or more accessories are described herein as a ski for use in the snow. Other accessories are contemplated, however, such as tracks for on and off road use, blades for use on ice, and alternative ski designs for use on water, among other things.

As shown in FIG. 2, examples of the present disclosure can comprise frame 202, an axle 204, a fork stop 206, and an accessory mount 208. In some examples, the frame 202 can comprise multiple pieces to facilitate manufacturing. The frame 202 can comprise, for example, one or more mounting plates 210 and one or more frame rails 212. In some examples, as shown, the mounting plates 210 can be bolted to the frame rails 212. In other examples, the mounting plates 210 can be, for example, riveted, pinned, welded, or attached with adhesive. In still other examples, the mounting plates 210 and frame rails 212 can comprise a single, integral piece—e.g., they can be cast, molded, or machined from a single piece of material. The mounting plates 210 and frame rails 212 can comprise a suitably light, strong material such as, for example, steel, titanium, plastic, fiberglass, carbon fiber, or other composite or metal material. The mounting plates 210 and frame rails 212 are preferably aluminum.

The system 200 can also include an accessory (e.g. a ski 216) to be attached to the system 200. In some examples, as shown, the accessory mount 208 can enable a ski 216 to be mounted on the system 200. This can enable the vehicle to glide over snow and ice and to be steered. When used on a motorcycle, leaning the motorcycle and/or turning the handlebars can cause the ski 216 to turn in much the same manner as is used when snow skiing. In other examples, the accessory 216 could comprise a skate blade, for example, for maneuvering on ice. The accessory 216 could also include a track for use in mud, sand, or other loose conditions.

In some examples, the accessory mount 208 can comprise a relatively smooth, curved bottom surface to enable the system 200 to glide through material such as snow without snagging. The accessory mount 208 can also comprise a relatively smooth, strong material such that the accessory mount 208 also reinforces, or "boxes," the frame rails 212. This makes the system 200 substantially rigid. Like the mounting plates 210 and frame rails 212, the accessory mount 208 can be, for example, riveted, pinned, welded, or attached to the frame rails 212 with adhesive. In still other examples, the mounting plates 210, side rails, and/or accessory mount 208 can comprise a single, integral component—e.g., they can be cast, molded, or machined from a single piece of material. The accessory mount 208 can also comprise a suitably light, strong material such as, for example, steel, titanium, plastic, fiberglass, carbon fiber, or other composite or metal material. The accessory mount 208 is preferably aluminum.

In some examples, the accessory mount 208 can include an accessory mounting hole 208a to enable the accessory 216 to be mounted to the system 200. In some examples, as shown, the accessory mounting hole 208a can enable the accessory 216 to be pivotably coupled to the system 200. In this manner, the accessory 216 can pivot about a lateral axis, Z, of the system 200. This can enable a ski 216 to pivot, for example, over changes in terrain. In other examples, the accessory mount 208 can include slots to enable the accessory to be slideably mounted to the system 200. In still other embodiments, the accessory mount 208 can include multiple accessory mounting holes 208a to enable the accessory 216 to be rigidly mounted to the system 200.

As shown, in some examples, the frame rails 212 can connect the accessory mount 208 to the one or more mounting plates 210. The mounting plates 210, in turn, can enable the system 200 to be mounted on the vehicle. The mounting plates 210 can comprise a suitably strong and light material capable of absorbing forces due to the weight of the vehicle and any additional loads caused by turning, accelerating, decelerating, and jumping, among other things.

As shown in FIGS. 2-5, in some examples, the mounting plates 210 can define an axle hole 218 and a fork stop hole 220. In this manner, as discussed in detail below, the mounting plates 210 can mount the system 200 to the forks 222 of a motorcycle, or other forked vehicle, and can also provide alignment of impact forces with the fork of the vehicle. The axle hole 218 can enable the system 200 to be mounted to the vehicle using the vehicle's existing axle holes 226 and axle 204 without modification. In other words, the axle 204 for the vehicle can be inserted through a first vehicle axle hole 226a on the vehicle, through the axle hole(s) 218 in the mounting plate(s) 210, and through the second vehicle axle hole 226b on the vehicle. This can enable the system 200 to be mounted to the vehicle's forks 222 and to rotate around the axle 204, as necessary.

In some examples, the system 200 can use the stock axle 204 for the motorcycle. Thus, the axle hole 218 can be sized and shaped to fit the stock axle 204. In other examples, the axle 204 can be specifically made for the system 200. In this configuration, the axle 204 can be sized and shaped to fit the axle hole 218 in a standardized mounting plate 210, for example, while the outer portions 204a of the axle 204 can be designed to fit the vehicle axle holes 226 of the forks 222 of the motorcycle. In this configuration, the system 200 can be standardized, with only different axles 204 used to adapt the system 200 to different motorcycles.

The mounting plates 210 can also include one or more fork stop holes 220. As shown, the fork stop 206 can be inserted through the fork stop holes 220 and secured using a suitable means. In some examples, the fork stop 206 can be threaded into one or both of the mounting plates 210. In other examples, the fork stop 206 can be threaded on either side to enable nuts to secure the fork stop 206 to, and center it on, the mounting plates 210. In still other examples, the fork stop 206 can be secured to the mounting plates 210 using, for example, a set screw, adhesive, tungsten inert gas (TIG) or metal inert gas (MIG welding, pinch clamps, pins, or clips. In some examples, the fork stop 206 can comprise one or more collars with setscrews to locate the fork stop 206 in the mounting plate 210.

The fork stop 206 can also include one or more interface points 224 where the fork stop 206 interfaces with the bottom 228 of the fork 222. In some examples, as shown, the interface points 224 can comprise flat surfaces at complementary angles to the bottoms 228 of the forks 222. In the manner, when the weight of the vehicle is resting on the ski 216, for example, the weight of the vehicle is supported by the vehicle's axle hole 226 via the axle 204 and the bottom 228 of the fork 222 via the fork stop 206.

This configuration provides several advantages. One advantage is that it enables the ski 216 to rotate backwards somewhat about the axle 204 when unloaded or impacted. So, if the ski 216 hits a rock submerged in the snow, for example, it can enable the ski 216 to move backwards rather than breaking off. This can prevent damage to the ski 216 and damage to the forks 222, among other things.

Figure 4:
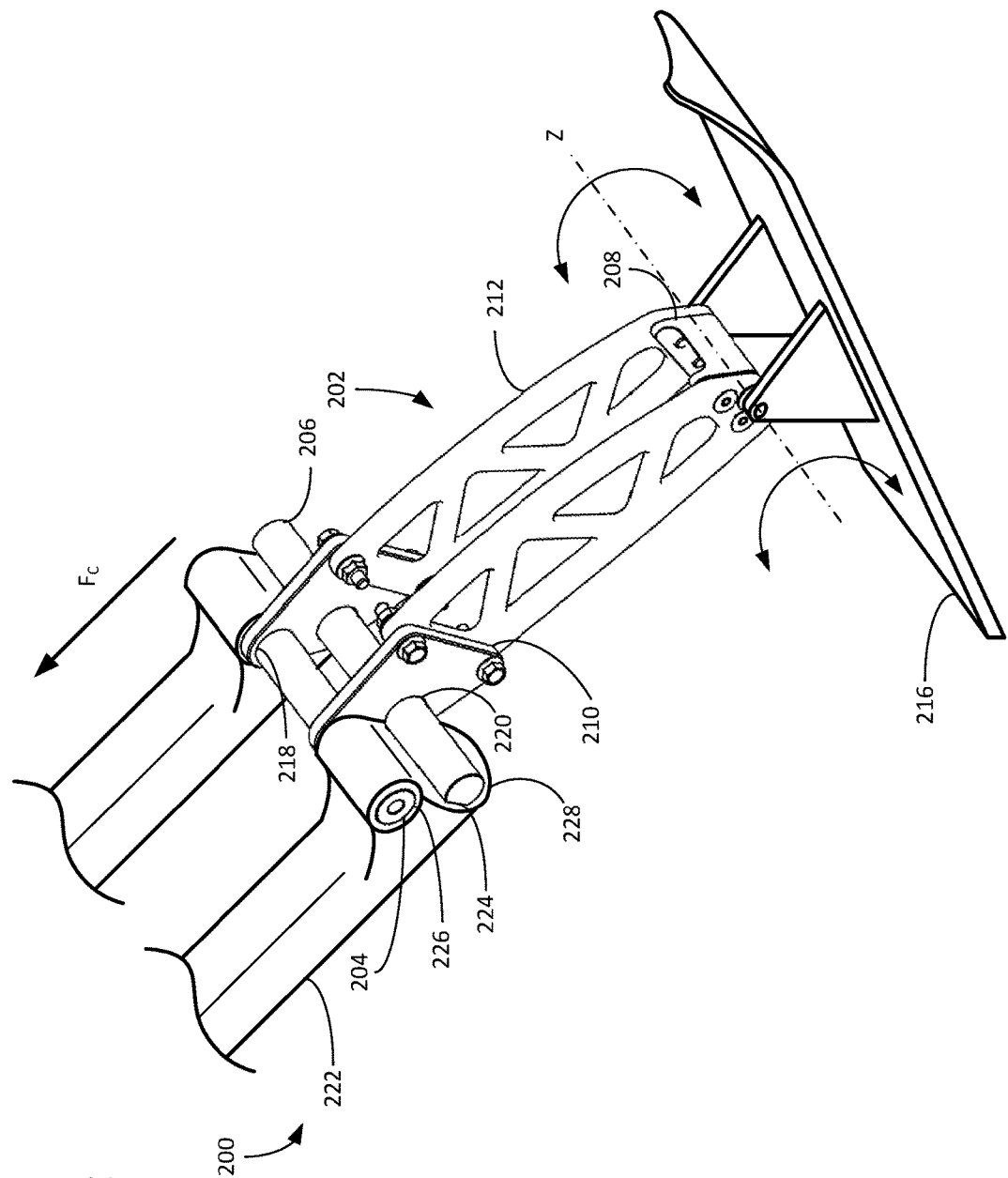
FIG. 4 depicts a right, front perspective view of the accessory mount for forked vehicles mounted to the forks of a vehicle and including a ski accessory, in accordance with some examples of the present disclosure.
Figure 5:
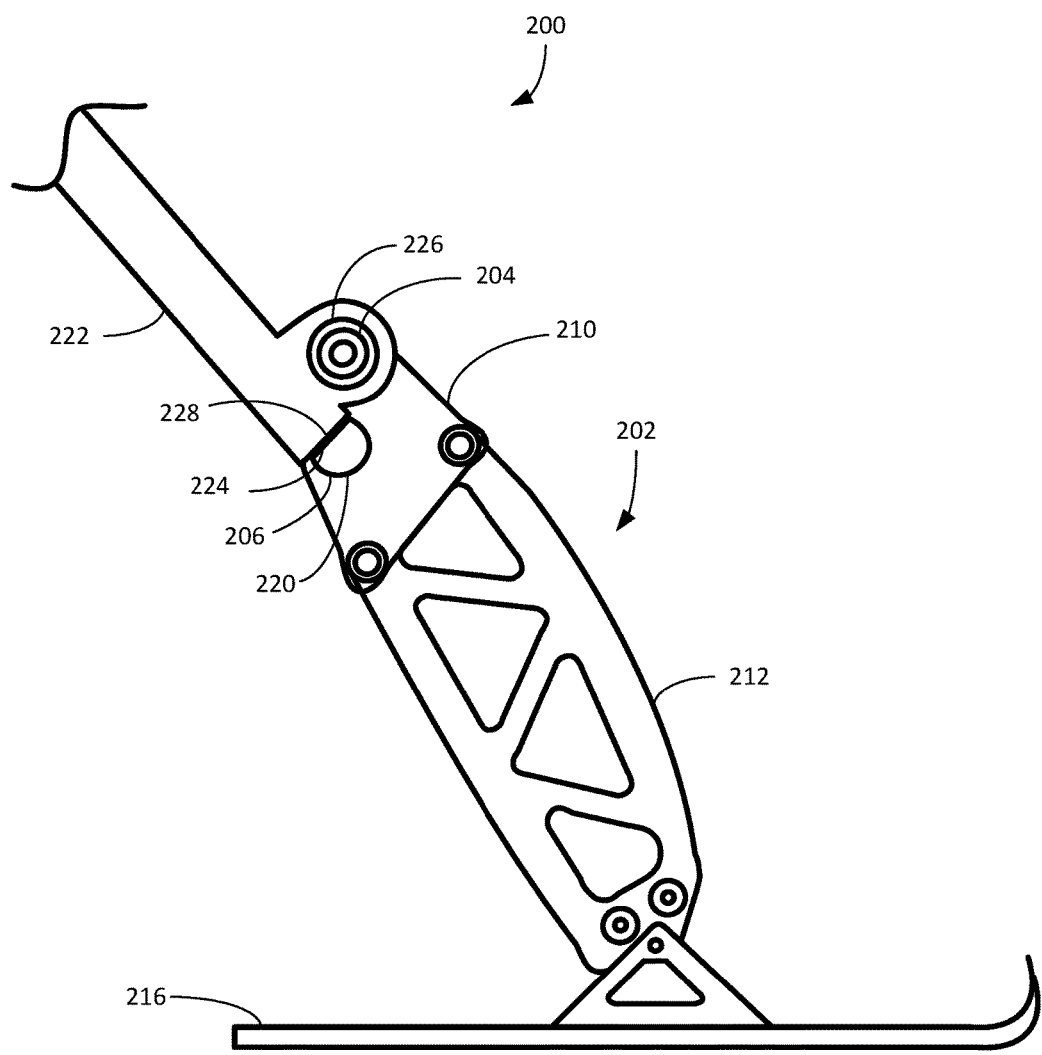
FIG. 5 depicts a right view of the accessory mount for forked vehicles mounted on the forks of a vehicle and including the ski accessory, in accordance with some examples of the present disclosure.
Figure 6:
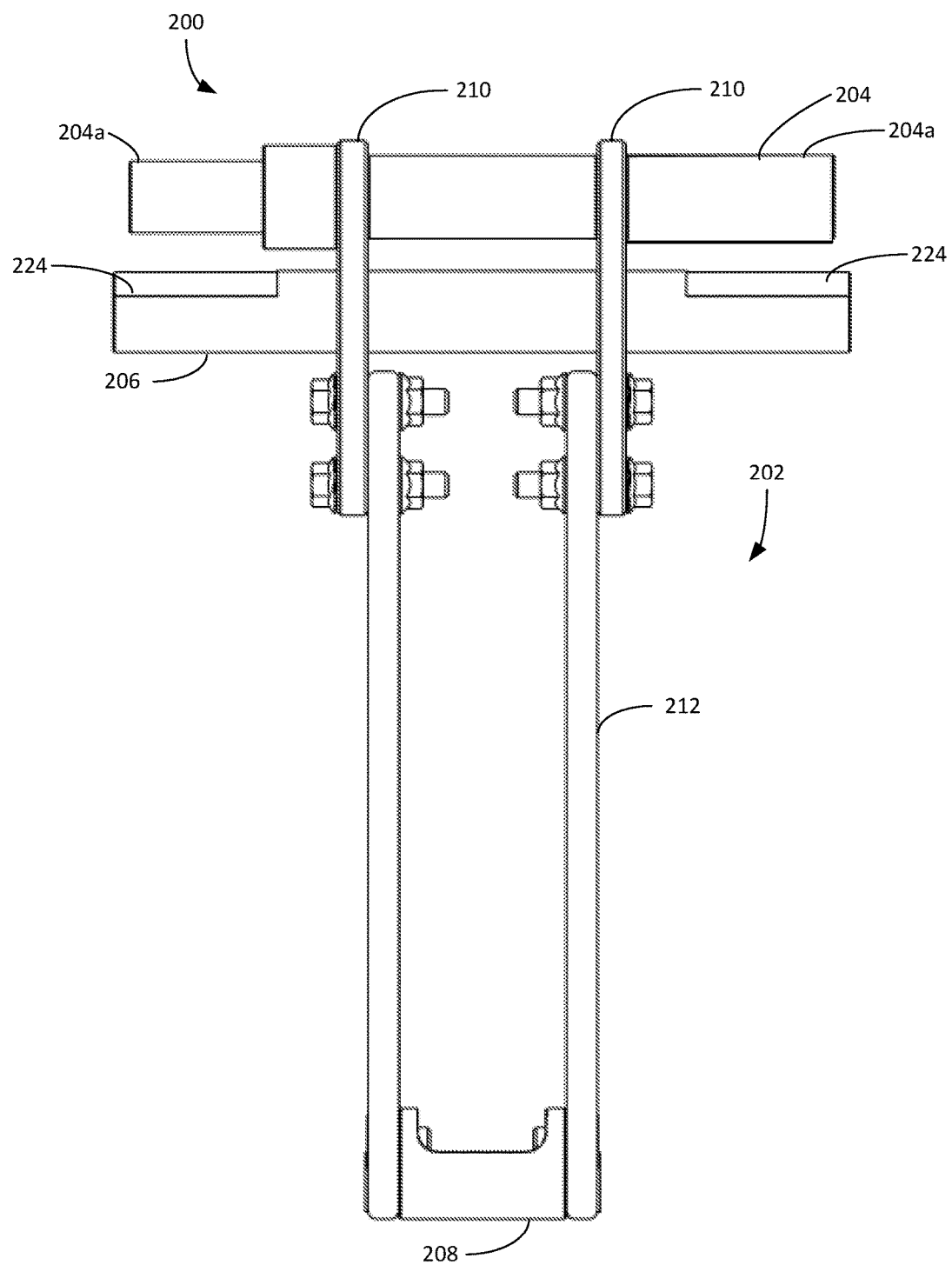
FIG. 6 depicts a front view of the accessory mount for forked vehicles, in accordance with some examples of the present disclosure.

More importantly, however, as shown in FIG. 4, the fork stop 206 enables compressive forces, $F_C$, generated on the fork 222 by the ski 216 to be transmitted to the fork 222 in a line parallel to the fork's 222 natural path of motion. In other words, unlike the conventional clamp-type mount discussed above, most, if not all, of the compressive forces exerted on the fork 222 are transmitted directly in-line with the fork tubes 222. In this manner, the aforementioned twisting forces, $F_T$, on the fork legs are substantially eliminated.

In addition, these forces are transferred directly to the fork 222 via the bottom 228 of the fork 222 where it is strongest. In other words, because the axle 204, brakes, and other components mount to the bottom of the fork 222, the fork caps 228 are reinforced and thus, are stronger than the fork tubes 222 enabling them to better absorb compressive forces. These compressive forces can be generated by the same forces that affect a motorcycle including, but not limited to, going over bumps, braking, and jumping.

In addition, the fork stop 206 can be designed such that it acts as a safety mechanism. In other words, the fork stop 206 can be designed, shaped, and sized such that it is the "weakest" link in the system 200. This can enable excessive forces to be absorbed by the fork stop 206 rather than damaging the forks 222. In other words, bending the fork stop 206, in and of itself, can help absorb and dissipate some of the excess energy in the system 200, rather than damaging the vehicle. Thus, overshooting a jump, for example, may result in a bent fork stop 206 rather than bent or broken forks 222. Spare fork stops 206 can be carried by the user to affect quick, low-cost repairs in the field rather than potentially being stranded with broken forks.

In some examples, the frame rails 212 can have a thin profile, such that they present a relatively small frontal area. When riding in deep snow, for example, this can enable the system 200 to "slice" through the snow without packing snow up in front of the vehicle. In some examples, the frame rails 212 can also act as a rudder when fording deep snow. In other words, turning the frame rails 212 (with the handlebars) as the vehicle moves through the snow can provide some additional steering authority as the snow travels around the frame rails 212. In some examples, the frame rails 212 can be shaped (e.g., like a blade or an airfoil) to enhance this effect.

Figure 7:
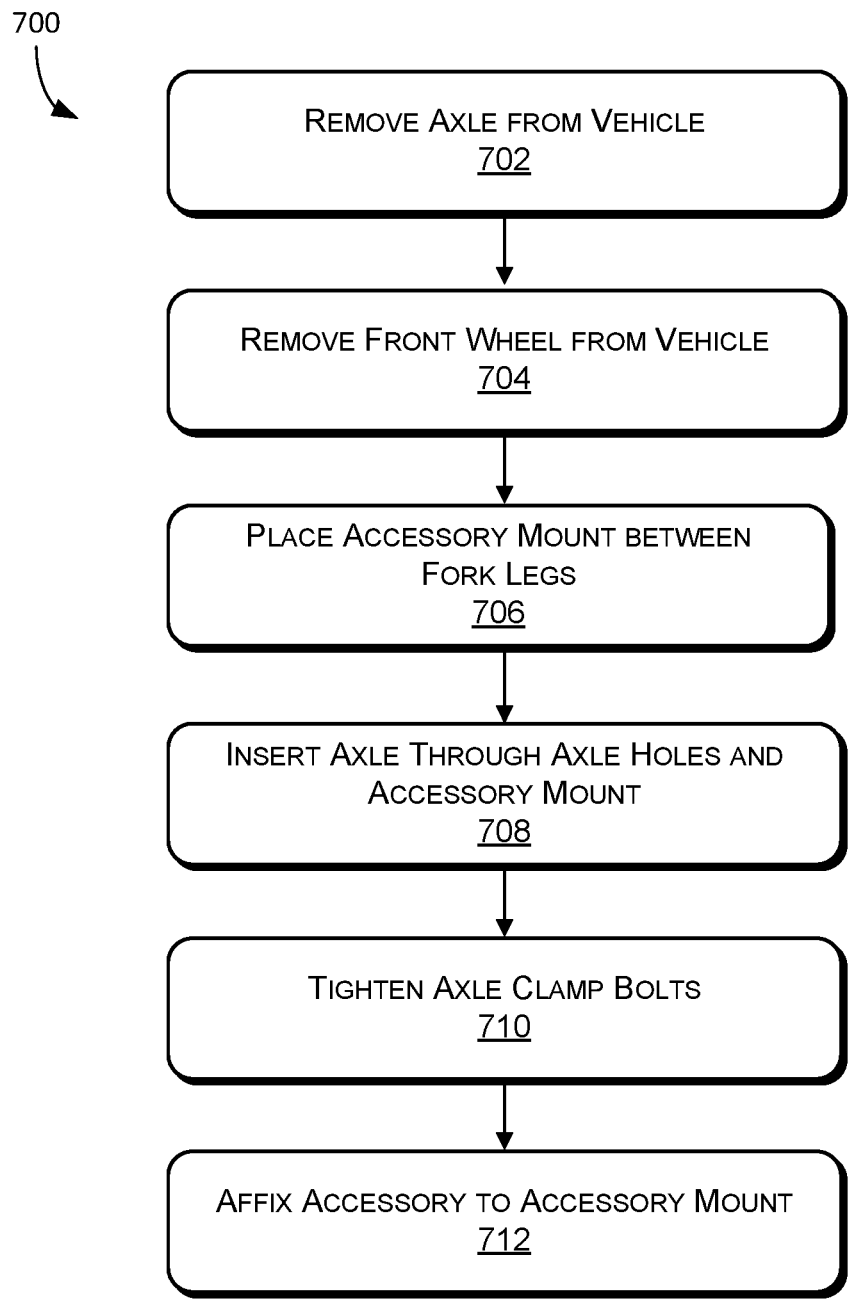
FIG. 7 is a flowchart depicting an exemplary process for installing the accessory mount on a forked vehicle, in accordance with some examples of the present disclosure.

Due to the efficient design, the system 200 can be easily and quickly installed and removed from a standard motorcycle. To this end, as shown in FIG. 7, examples of the present disclosure can also comprise a method 700 for converting a forked vehicle with a wheel, or other device, into a forked vehicle with an accessory, such as a ski 106. At 702, the user can remove the stock axle 204 from the vehicle in the normal manner. This can include supporting the motorcycle with a lift or stand or supporting the front of the motorcycle with a front fork stand. This can also include loosening an axle nut, axle bolt, and/or axle clamp bolts. Once loose, the axle 204 can generally be slid out one side of the fork legs 222 or the other for removal.

At 704, once the axle 204 has been removed, the front wheel can be removed from the vehicle. On a motocross bike, due to the amount of travel in the suspension and the mounting location of the front fender, this is generally easily accomplished. The user can simply roll the front wheel out from between the fork legs 222. On some street bikes and other vehicles, this may require the removal of the front fender, fork brace, and/or other components.

At 706, the user can place the system 200 between the front forks 222 and align the axle holes 218 for the system 200 with the vehicle axle holes 226. Because a majority of the system 200 is below the axle line, this is easily accomplished. Of course, with the motorcycle or front end off the ground, the user may need to lift the system slightly to align the axle holes 218, 226.

At 708, the user can insert the axle 204 through the axle holes 218, 226 to affix the system 200 to the motorcycle forks 222. As mentioned above, in some examples, the system 200 can be designed to use the stock axle 204 from the motorcycle. In this manner, the system 200 can be installed in the same manner, and with the same ease, as the stock wheel. In other examples, the axle 204 can be customized for each motorcycle, such that the axle 204 acts as an adapter for each type or brand of motorcycle and the system 200 can be standardized. The user can also ensure that the fork stop 206 is properly located on the bottom 228 of the forks 222, thought this can also largely be a function of system 200 geometry.

At 710, the axle 204 can be affixed to the forks 222 in the standard manner. As mentioned above, the user may one or more axle nuts, axle bolts, or axle clamp bolts, depending on the vehicle. At 712, the user can affix the accessory 216 to the system 200. A ski 216 can be installed using a cross bolt, for example, to enable the ski 216 to pivot. In other uses, the accessory 216 may be installed using multiple bolts to affect a rigid mount. In still other uses, the accessory 216 may be installed on, for example, a slotted, hinged, or spring-loaded mount, as desired for a particular accessory 216. Of course, in some cases, the accessory 216, such as a ski 216, can already be attached to the system 200 upon installation, obviating this step.

The terms "motorcycle" and "ski" are used herein to simplify the disclosure. These terms are not intended to limit the disclosure. As used herein, the term motorcycle could also refer to other forked vehicles. Similarly, the term "ski" is used to describe the accessory mounted on the system 200. As mentioned above, however, other accessories, such as tracks, skate blades, and roller blades could be used.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
   a frame comprising:
      a first mounting plate, with a first end and a second end, the first mounting plate defining:
         a first axle hole to receive an axle from a vehicle to detachably couple the system to a fork on a vehicle; and
         a first fork stop hole;
      a first frame rail, with a first end and second end, the first end of the first frame rail detachably coupled to the second end of the first mounting plate;
   an accessory mount, detachably coupled to the second end of the first frame rail, to couple an accessory to a vehicle;
   a fork stop, disposed through the first fork stop hole, the fork stop configured to rest against a bottom portion of one or both fork tubes of the fork to radially locate the system on the fork tube;
   a second mounting plate, disposed opposite the first mounting plate, the second mounting plate with a first end and a second end, the second mounting plate defining:
      a second axle hole; and a second fork stop hole; and
a second frame rail, disposed opposite the first frame rail, the second frame rail with a first end and second end, the first end detachably coupled to the second end of the second mounting plate;
wherein the accessory mount is detachably coupled to the second end of the first frame rail and the second frame rail.

2. The system of claim 1, wherein the accessory is a ski.

3. The system of claim 1, wherein the fork stop enables the system to rotate in a first direction about the axle; and
wherein the fork stop prevents the system from rotating in a second direction about the axle.

4. The system of claim 1, the accessory mount defining a mounting hole configured to enable the accessory to pivot about a lateral axis of the system.

5. The system of claim 1, wherein the fork stop is positioned relative to the axle such that forces exerted on the accessory are transferred to the fork in a substantially linear manner.

6. The system of claim 1, wherein the first and second mounting plates, first and second frame rails, and the accessory mount are integral components.

7. The system of claim 1, wherein the fork stop has a lower yield strength than a bottom portion of both fork tubes such that the fork stop bends in response to an impact to the accessory rather than damaging the fork tubes.

8. A method comprising:
removing an axle from a front forks of a vehicle;
removing a front wheel from the front forks;
placing an accessory mounting system between the front forks;
inserting an axle through an axle hole on the front forks and an axle hole on the accessory mounting system to detachably couple the accessory mounting system to the vehicle; and
affixing the axle to the vehicle;
inserting a fork stop through a fork stop hole on the accessory mounting system; and
rotating the fork stop such that one or more interface points on the fork stop interface with one or both fork caps on the vehicle.

9. The method of claim 8, further comprising:
detachably coupling an accessory to an accessory mount of the accessory mounting system.

10. The method of claim 9, wherein the accessory is a snow ski.

11. The method of claim 8, wherein the axle comprises a stock axle from the vehicle.

12. The method of claim 8, wherein removing the axle from the front forks of the vehicle comprises removing the stock axle for the vehicle; and
wherein inserting the axle through the axle hole on the front forks and the axle hole on the accessory mounting system to detachably couple the accessory mounting system to the vehicle comprises installing a custom axle configured to adapt the accessory mounting system to the front forks of the vehicle.

* * * * *